BLAKE & JOHNSTON.

Sewing Machine Guide.

No. 1,569. Reissued Nov. 10, 1863.

WITNESSES

Geo. E. Hardy

D. Wm. Magney

INVENTORS

S. E. Blake

F. Johnston

N. PETERS, Photo-Lithographer, Washington, D. C.

UNITED STATES PATENT OFFICE.

ALFRED DAVIS AND LORENZO D. DAVIS, OF WORCESTER, MASSACHUSETTS, ASSIGNEES, BY MESNE ASSIGNMENTS, OF S. E. BLAKE AND THOMAS JOHNSTON, OF LOUISVILLE, KENTUCKY.

IMPROVEMENT IN HEMMING-GUIDES FOR SEWING-MACHINES.

Specification forming part of Letters Patent No. 25,715, dated October 11, 1859; Reissue No. 1,569, dated November 10, 1863.

*To all whom it may concern:*

Be it known that SOLOMON E. BLAKE and THOMAS JOHNSTON, both of Louisville, Jefferson county, Kentucky, did invent a new and Improved Adjustable Hemming and Tucking Guide or Gage for Sewing-Machines; and we do hereby declare the following to be a full, clear, and exact description of the same, reference being had to the accompanying drawings, figures, and letters of reference thereon, making part of this specification.

Figure 4:
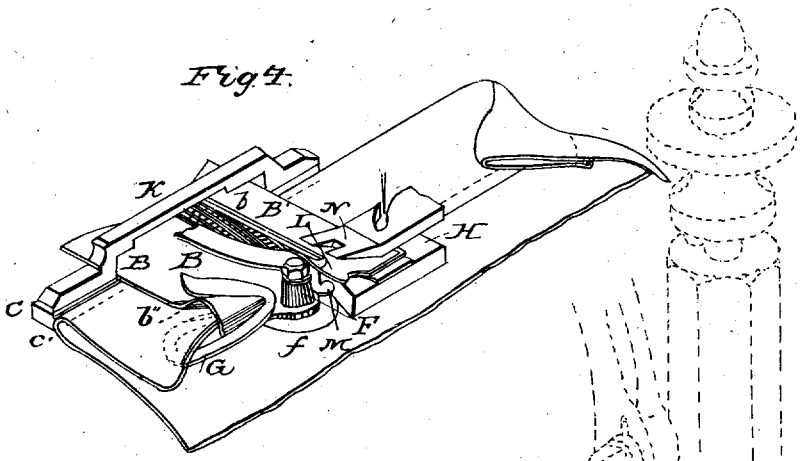
Figure 1:
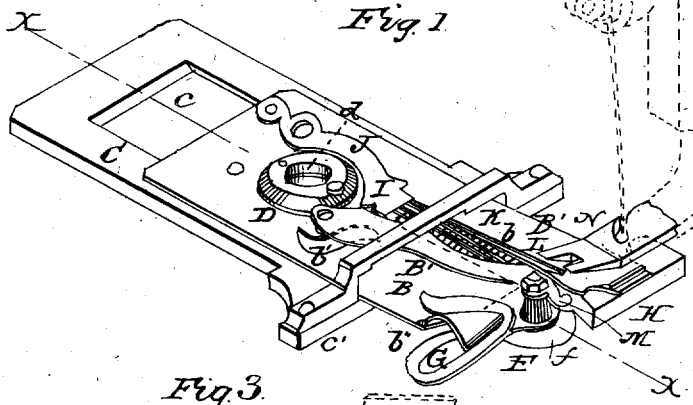
Figure 3:
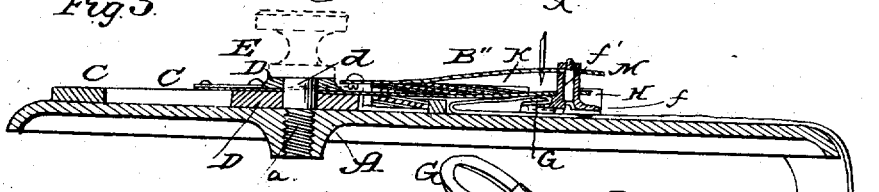
Figure 2:
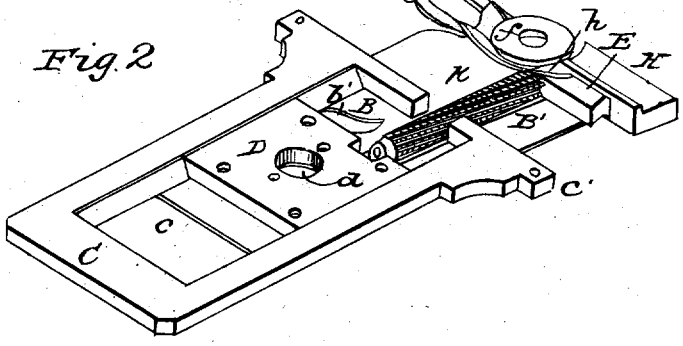

Of the said drawings, Figure 1 is a double-size perspective view of our hemming and tucking apparatus. Fig. 2 is a drawing of the same inverted. Fig. 3 is a vertical section taken through X X, Fig. 1. Fig. 4 shows the operation of the hemmer.

Said invention relates to adjustable hemming and tucking guides or gages for sewing-machines; and it consists, first, in a scroll or hem turner combined with a yielding spring-plate, and applied to a plate for adjustment to a sewing-machine.

The second part of said invention consists in the combination and arrangement of the scroll or hem-turner, flanged roller, and yielding spring-plate.

The third part of said invention consists in the employment of two spring-plates, to one of which is secured the hem-turner and to the other a pad to rest upon the material and hold it to the feeding-surface of the machine, in combination with an adjustable gage.

The fourth part of said invention consists in a yielding fluted or notched roller to smooth, flatten, and present the hem or tuck to the action of the needle as the material is fed forward for stitching.

The fifth part of said invention consists in a presser-pad attached to a spring and resting upon the material to hold it to the feeding-surface of the machine, in combination with the scroll or hem-turner.

The last part of said invention consists in the combination and arrangement of a hem-turner, presser-piece, grooved or notched roller, and adjustable guide or gage.

To enable others skilled in the art to make and use said invention, we will describe the construction and operation of the same.

A represents the plate of a sewing-machine.

B B′ is the guide-frame, consisting chiefly of a thin plate of spring-steel, partially divided by a longitudinal gap or interval, *b*.

C is a stiff metallic plate of U form, called the "gage," and provided with a square flange or shoulder, C′. The gage C is restricted to rectilinear adjustment beneath the frame B B′ by a boss, D, on the bottom of the frame, occupying a dovetailed longitudinal slot, *c*, in the gage. A central aperture, *d*, in the boss D admits the clamping-screw E, which, fitting a screw-hole in the plate A, serves the twofold purpose of holding the guide or gage to the plate and of clamping and holding the gage at any desired point of adjustment.

Each of the limbs B and B′ constitutes a spring adapted to yield upward at its free end. An oblique slot, *b*′, in the limb B, causes its flexibility to be chiefly in an oblique direction from the corner *b*″ outward and forward with respect to the hem, so as to facilitate the insertion of the material, and the passage of cross-seams and other irregularities therein. The flexibility of the limb B′ is transverse to the hems. The free end of the limb B is surmounted with a supplementary spring, B″, from which depends vertically a stud-shaft, *f*′, forming the axis of a conical roller, F, fluted longitudinally and terminating below in a flange, *f*. From the top of the limb B projects also a tongue, G, of spring-steel, having its free extremity flattened and twisted in a right-hand spiral form. This tongue is for the first half of its length directed backward, and is thence reflexed, so that its extreme tip enters the space between the flange *f* of the roller F, and the under side of the limb B, against which latter it slightly presses.

The form and relative adaptation of the yielding frame B, spiral tongue G, and flanged roller F facilitate the turning and folding of hems containing cross-seams and material of variable thicknesses. The limb B′ has beneath its free end a boss or pad, H, having a chamfer, *h*, to facilitate the entrance of the hem, a bounding shoulder, $h'$, for the inner edge of said hem, and a notch, $h''$, for the passage of the needle.

K is a roller occupying the central intervals, $b$ and $c$, of the frame end of the gage, and journaled at its respective ends in the pad H, and in a yielding block, I, united by a spring, J, to the frame B B′. The limb B′ is more rigid than the spring J, so as to enable the pad H to tightly press the inner edge of the hem where the feed is applied, and so that the roller K may derive its rotation chiefly from the advance of the inner edge of the hem, the outer end of the roller reacting upon the hem toward and at its outer edge, so as to keep it flat and to its full width. The roller K, by its capacity for yielding bodily upward or at either end, permits the easy and equal passage of the hem, notwithstanding any inequality of thickness of texture or irregularity of draft. To insure the efficiency of the roller K in preserving a flat hem or tuck of uniform breadth, we form on the surface a series of right-hand spiral ribs indented with transverse nicks or grooves, as seen in all the drawings.

L and M are handles by means of which the pad H and the rollers F and K may be temporarily retracted for the purpose of inserting or removing the work.

For heavy work the ordinary pressure-pad N may be used by resting upon and assisting the action of the pad H and roller K.

Operation: The guide is placed in position so that the thumb-screw E occupies the screw-hole $a$ in the plate A of the sewing-machine, and so that the notch $h''$ coincides with the path of the needle. The gage C is then adjusted so as to bring its shoulder C′ to the required distance from the seam and the whole clamped fast by the screw E. The edge of the cloth is then folded a short distance and inserted in the scroll or hem turner, and the machine being set in motion but little care is required on the part of the operator to complete the hem. A gage of this construction acts to hold the hem or tuck fold flat upon the plate or bed of the sewing-machine, and to cause it to advance uniformly and equally without crimping or narrowing the hem, the yielding and spirally-fluted roller K acting to press the folded or outer edge of the hem forward and outward against the shoulder of the gage, and the yielding conical roller F easing the inner edge of the fold at that part of the scroll where it is subjected to the greatest pressure, and permitting the passage of seams and other irregularities, as before explained. For these reasons said invention is especially applicable to seams of unusual width and irregular thicknesses of material.

We claim as the invention of the said BLAKE and JOHNSTON—

1. The hem-turner G, combined with and attached to a spring, B, applied and arranged for adjustment to a sewing-machine, substantially as described and set forth.

2. The combination and arrangement of the hem-turner G, spring B, and roller $f$, substantially as and for the purposes set forth and specified.

3. The yielding spring-plate B, with its hem-turner G, and B′ with its presser-piece H, in combination with the adjustable gage C, substantially as described and specified.

4. The yielding presser-roller K, to smooth, flatten, and present the hem or tuck to the action of the needle as the material is fed forward for stitching, substantially as described and set forth.

5. The presser-piece H, attached to the spring B′ and holding the material to the feeding-surface of the sewing-machine, in combination with the hem-turner G, substantially as set forth and specified.

6. The combination and arrangement of the hem-turner G, presser-piece H, roller K, and adjustable gage C, substantially as described, and for the purposes specified.

ALFRED DAVIS.
LORENZO D. DAVIS.

Witnesses:
EDWIN FREEMAN,
SILAS HAMILTON.